(12) United States Patent
Fritz

(10) Patent No.: US 7,188,385 B2
(45) Date of Patent: Mar. 13, 2007

(54) PICK BRUSH

(76) Inventor: Robert A. Fritz, 3542 Ridge Blvd., Palm Harbor, FL (US) 34684

(*) Notice: Subject to any disclaimer, the term of this patent is extended or adjusted under 35 U.S.C. 154(b) by 0 days.

(21) Appl. No.: 10/945,495

(22) Filed: Sep. 21, 2004

(65) Prior Publication Data
US 2006/0059641 A1 Mar. 23, 2006

(51) Int. Cl.
*A47L 13/12* (2006.01)
(52) U.S. Cl. .............................. 15/111; 15/105; 15/113; D4/116; D4/118; D4/129
(58) Field of Classification Search .................. 15/105, 15/111, 113; D4/116, 118, 129
See application file for complete search history.

(56) References Cited

U.S. PATENT DOCUMENTS

| 1,776,443 | A | * | 9/1930 | Martin | 15/111 |
| 2,536,942 | A | * | 1/1951 | Kanter | 15/111 |
| 2,857,608 | A | * | 10/1958 | Schwartz | 15/111 |
| 3,961,392 | A | * | 6/1976 | Young | 15/105 |
| 5,819,355 | A | * | 10/1998 | Wu | 15/106 |
| D448,572 | S | * | 10/2001 | Gravlee | D4/116 |

FOREIGN PATENT DOCUMENTS

GB     2357692    *   7/2001

* cited by examiner

Primary Examiner—Mark Spisich

(57) ABSTRACT

A utility brush including a plastic body with plastic bristles and a grip portion. A stainless steel pick device is molded into the grip portion of the plastic brush body which may be used as either a pick or a scraper.

1 Claim, 5 Drawing Sheets (2) PICK (3) HANDLE OF BRUSH

PICK BRUSH

FIELD OF THE INVENTION

The present invention pertains to a cleaning implement including both a brush and pick device which may be used as either a pick or a scraper.

BACKGROUND OF THE INVENTION

Various objects and surfaces become dirty over extended periods of time. Although there have been various cleaning devices used in the past, the present invention attempts to provide a more effective removal of debris.

SUMMARY OF THE INVENTION

The present invention provides a combined cleaning implement which provides for improved cleaning and removal of dirt and debris from various objects and surfaces. The combined cleaning device includes both a plastic body to which are secured a plurality of plastic bristles as well as including a stainless steel pick device molded into a grip portion of the plastic body. The pick device enabling embedded dirt and debris to be loosened from the surface to be cleaned while the brush portion may then be utilized to brush away the loosened debris from the surface to more effectively remove the debris from the object being cleaned. The cleaning tool of the present invention may be used to clean a variety of surfaces. Including among these are the feet of horses, various sports shoes (eg, baseball, football, soccer, golf, lacrosse and rugby) and further the cleaning tool may be used to clean ordinary household objects. Examples of household uses of the present invention include the tracks of sliding glass or screen doors as well as a painting tool for picking out the old caulk build up and then the leftover caulk build up can be brushed away with the brush portion.

BRIEF DESCRIPTION OF THE DRAWINGS

A preferred embodiment of the invention will now be described with reference to the accompanying drawings in which.

DETAILED DESCRIPTION OF THE INVENTION

Figure 1:
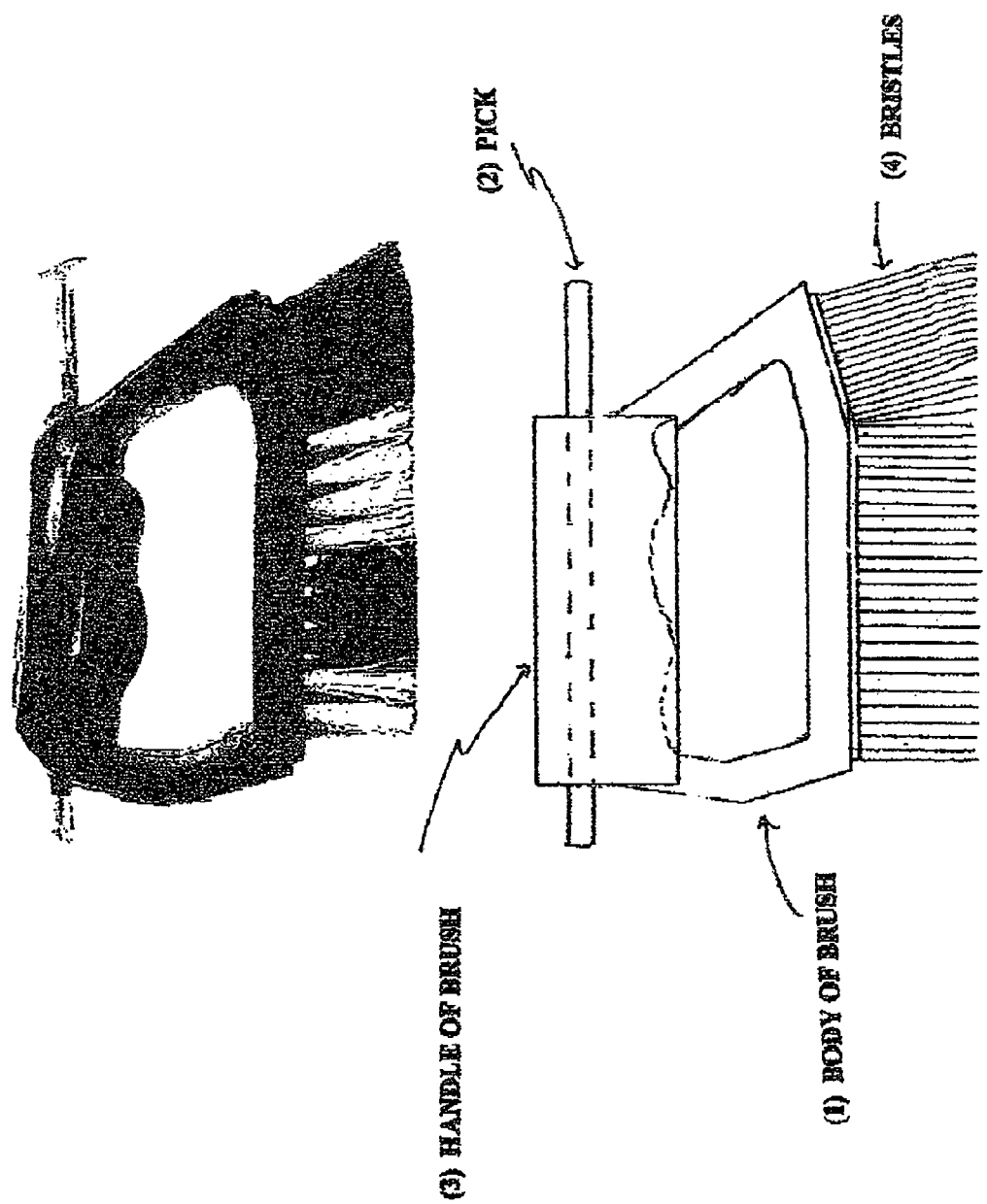
FIG. 1 show a side view of the tool.
Figure 2:
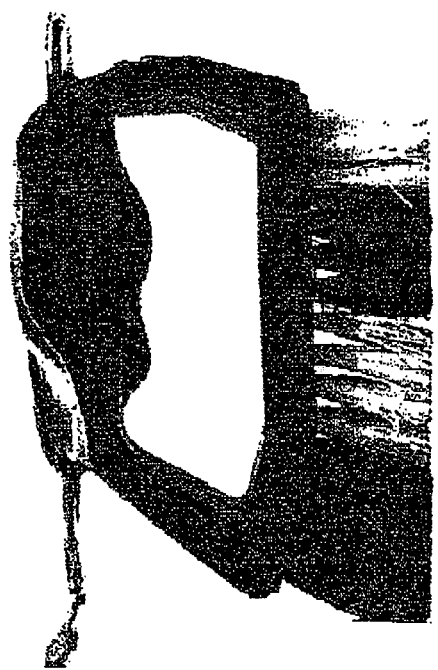
FIG. 2 shows another side view of the tool.
Figure 2:
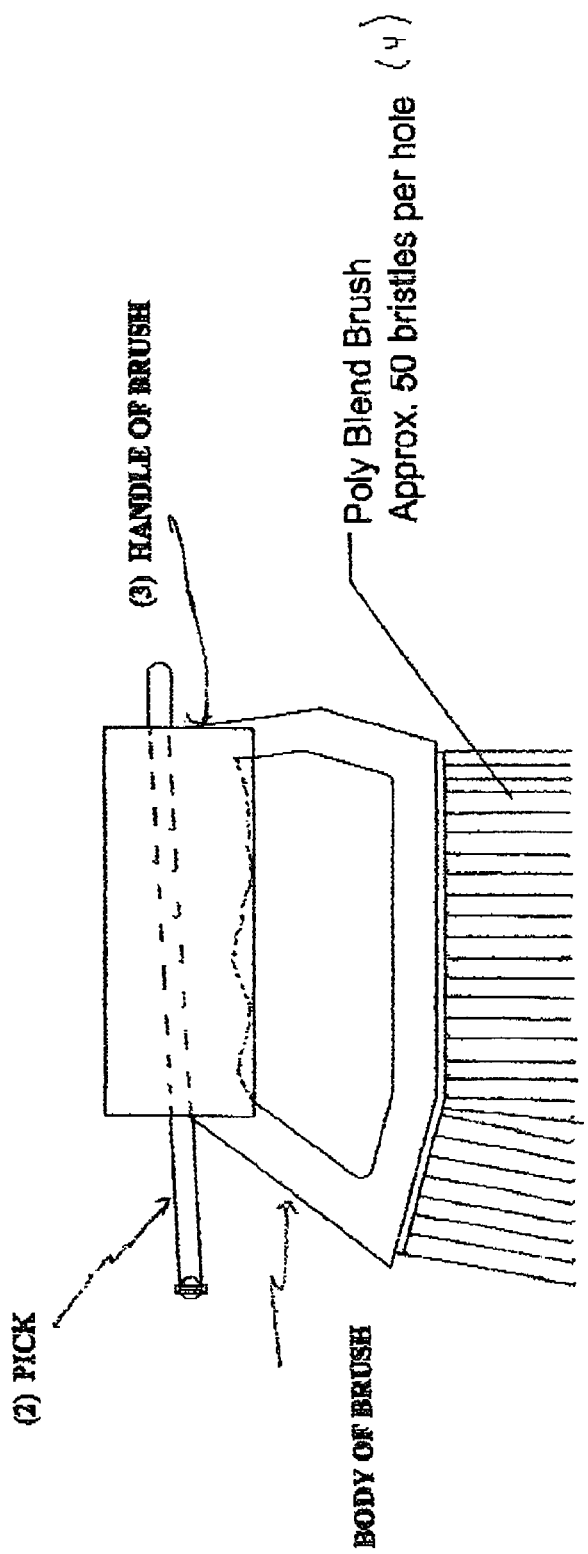
Figure 3:
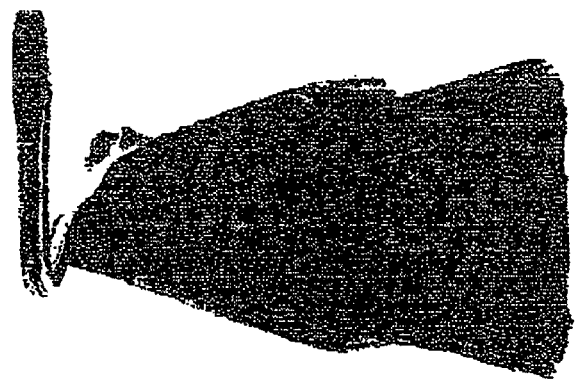
FIG. 3 shows a head-on view of the tool.
Figure 3:
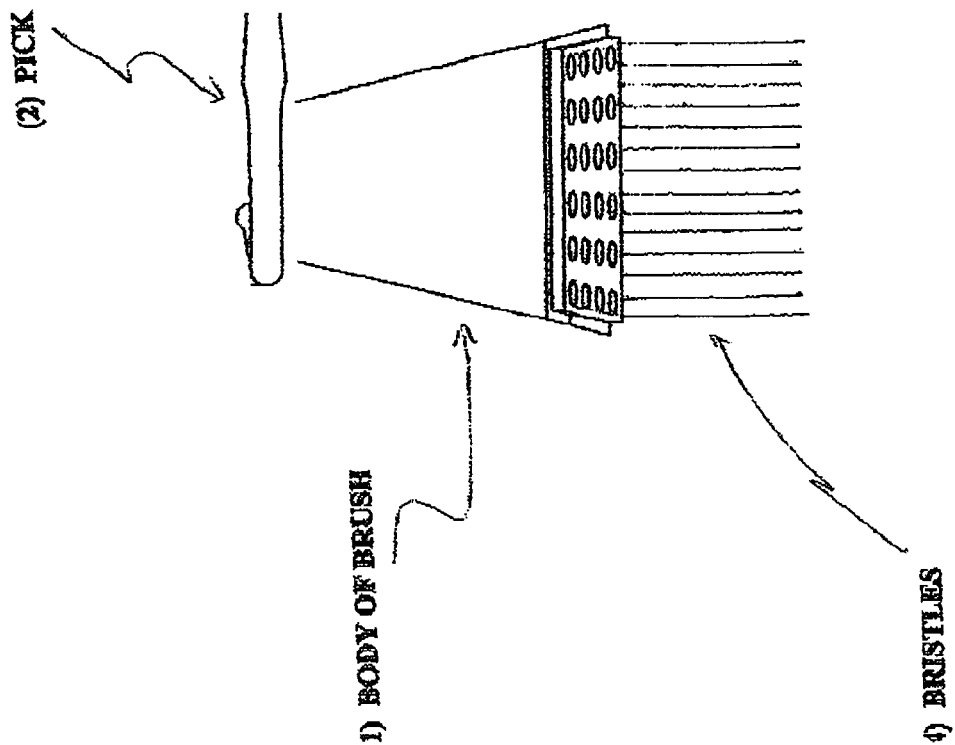
Figure 4:
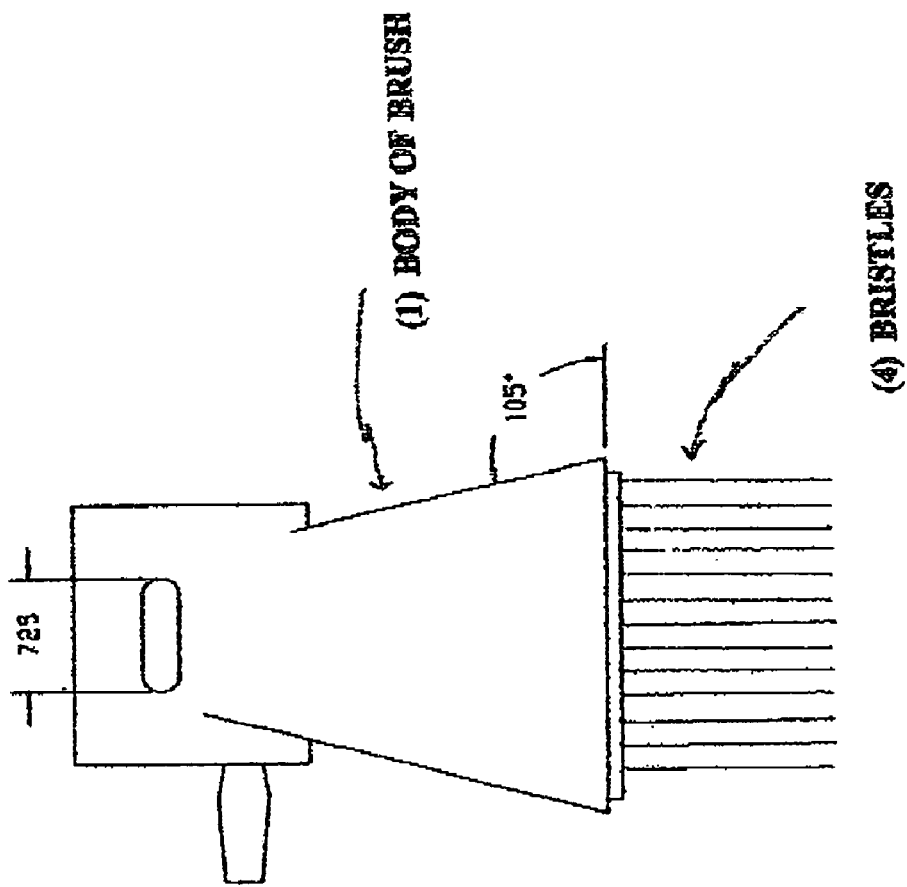
FIG. 4 shows a back view of the tool.
Figure 4:
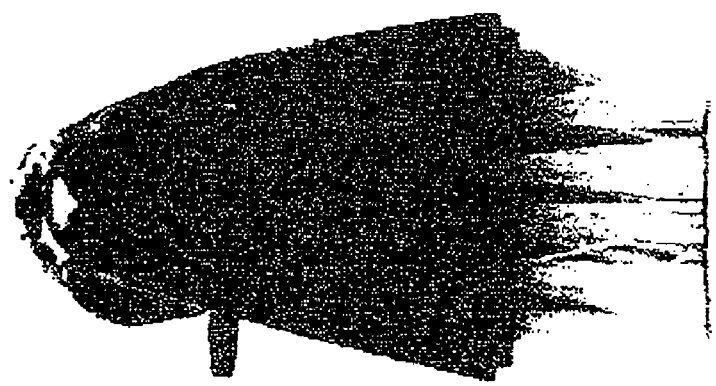
Figure 5:
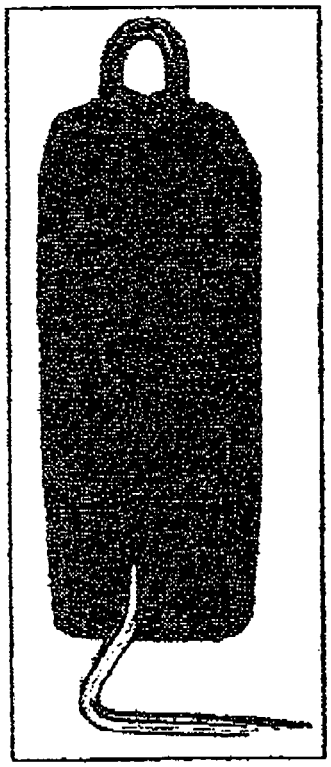
FIG. 5 shows an overhead view of the tool.
Figure 5:
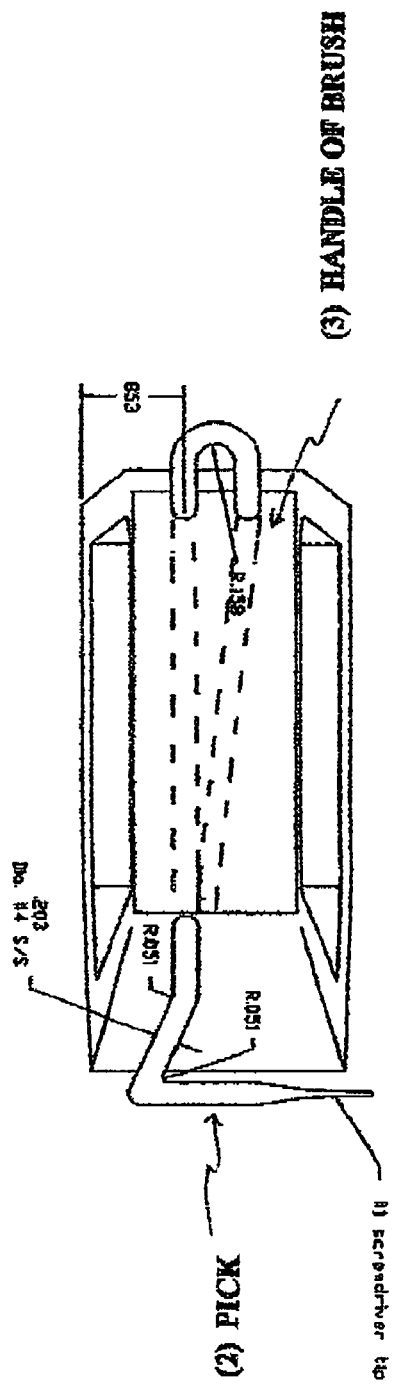

As shown in the figures, the cleaning tool comprises a plastic brush body (1) including a handle or grip portion (3). The handle portion (3) may include an ergonomic surface enabling gripping by the user. The body (1) further defines an area for accommodating the user's fingers. A bottom portion of the brush body (1) includes a plurality of plastic bristles (4). Molded in the handle portion (3) is a stainless steel pick (2) which may be used to loosen and remove debris from a surface to be cleaned. The pick (2) extends from the handle (3) and includes a bend therein to define a substantially straight working end of the pick (2). This end of the pick (2) includes a tapered portion having the shape similar to that of a #1 screwdriver tip. As is also shown in the drawings the working end of the pick (2) is oriented transverse with respect the handle (3) as well as the bristles (4). The pick brush of the present invention thus combines both a cleaning brush and a pick such that debris may first be removed or loosened with the pick and then subsequently removed by the brush.

I claim:
1. A cleaning device comprising:
a) a plastic brush body comprising a base member including a bottom surface, said bottom surface including a plurality of bristles extending therefrom, a grip portion disposed above the base member and substantially parallel thereto with an open region defined between the grip portion and a top surface of the base member with the open region accommodating the user's fingers; and
b) a stainless steel pick device including a first portion molded into the grip portion, said pick device further including a second portion extending from an end of the grip portion, said second portion including a bend therein defining a substantially straight free end portion disposed transverse with respect to the first portion, said straight free end portion ending in a tapered tip portion, said straight free end portion further being oriented transverse with respect to the bristles on the bottom surface of the base member.

* * * * *